3,016,398
STABILIZED PHYTIC ACID SOLUTIONS AND METHODS OF PREPARATION THEREOF
Roy F. Larson, David P. Langlois, and Paul R. Shildneck, all of Decatur, Ill., assignors to A. E. Staley Manufacturing Company, Decatur, Ill., a corporation of Delaware
No Drawing. Filed Apr. 6, 1959, Ser. No. 804,065
17 Claims. (Cl. 260—461)

This invention relates to aqueous phytic acid solutions of improved color stability and to methods for the preparation thereof.

This application is a continuation-in-part of our copending applications Serial Numbers 663,372 and 663,373, both filed June 4, 1957.

Solutions of phytic acid are prepared by liberating the free acid from its naturally occurring salts. Methods of performing this preparation are disclosed in United States Patents Numbers 2,691,035 and 2,718,523, issued October 5, 1954 and September 20, 1955, respectively, to M. J. Thomas. In both of these patents, an essential step is the treatment of a water-insoluble phytate with an acid-retreatment of a cation-exchange resin. As disclosed in those patents, acid phytate salts derived from the ion exchange are heated for a short period to insolubilize a small amount of metal phosphate present. To decolorize the solution, the acid phytate salt or phytic acid may also be treated with charcoal either concurrently with the heat treatment or thereafter. In any event, the phytic acid solutions described in these patents are relatively dilute, being of the order of 20% or less phytic acid by weight.

It is well known that aqueous solutions of phytic acid including those prepared by the methods of the Thomas patents are erratically unstable, even after the heat and charcoal treatments described therein. For unknown reasons, some preparations remain light-colored at room temperature for days or even weeks, whereas others, apparently prepared in the same way, darken in a day or two. When the color change is gradual, it may or may not be followed by the appearance of a black or dark-brown precipitate. When the color change is abrupt, taking place within an hour or two, it is almost always followed by the appearance of a dark precipitate.

Two general methods for alleviating the objectionable discoloration are known. One is to add a small proportion (e.g., up to 5%) of a strong non-oxidizing, mineral acid to the phytic acid solution. The usual effect of a mineral acid, such as hydrochloric or sulfuric, is to delay the onset of the discoloration and then limit the color formation to varying shades of amber. The other known method is that of Baldwin Patent Number 2,815,360, which discloses the addition of a small proportion of an oxidizing substance such as sodium nitrite, nitric acid or sodium hypochlorite to relatively dilute phytic acid solutions (40% or less). In such solutions, the oxidizing agent delays the onset of color longer than the non-oxidizing acid, but eventually the protective action is exhausted. The final result is a darker solution than one obtained using a non-oxidizing mineral acid as stabilizer. Furthermore, almost without exception, a dark precipitate ultimately appears in phytic acid solutions treated with oxidizing agents. It is to be noted that this color development occurs even though the phytic acid has been previously purified by heating, has been treated with charcoal and has been stabilized thereafter with the nitric acid. These effects are particularly pronounced in more concentrated solutions than those disclosed in the patents referred to, i.e., solutions of more than about 40% by weight.

Nitric acid has other disadvantages. Its decomposition products, particularly $NO_2$ and $N_2O_4$, themselves impart a color to the air space above the concentrated solutions in addition to the color due to the instability of the phytic acid. Furthermore, the pressure in closed containers of phytic acid slowly builds up with consequent danger.

The primary object of our invention is to prevent or alleviate the objectionable discoloration of concentrated aqueous solutions of phytic acid during storage.

Another object of our invention is to improve upon known methods for stabilizing the color of phytic acid solutions, particularly those based on the addition of small proportions of nitric acid to the solutions, so that they are effective in high concentrated solutions.

A further object of our invention is to avoid the objectionable gassing of concentrated phytic acid solutions containing nitric acid, the gassing being accompanied by the color and pungent odor of $NO_2$ and $N_2O_4$ mixtures, and development of pressure within closed containers.

Another object of our invention is to provide new aqueous composition of phytic acid with improved color stability.

Other objects will appear during the following description of our invention.

We have discovered that concentrated phytic acid solutions (i.e., not substantially less than 40% by weight) can be stabilized to a much greater degree than heretofore by adding to such solutions a color stabilizing amount of the combination of (1) a compound of the group consisting of nitric acid and colorless water-soluble salts thereof and (2) a colorless water-soluble amino-group-containing compound of a certain class, urea being an example.

As described above, it had been accepted that an oxidizing agent (even sodium hypochlorite) is suitable for stabilizing aqueous phytic acid solutions, at least when relatively dilute. The effect of the combination of the amine and nitric acid, in accordance with our invention, is therefore surprising for this reason: when urea, our preferred amine, is used with nitric acid, the nitric acid does not oxidize organic compounds; in fact, the presence of urea is necessary in some nitration reactions to suppress the oxidizing reaction which competes. Accordingly, it might be expected that, if the oxidizing property of nitric acid were necessary, the urea would enhance the instability of phytic acid solutions containing nitric acid. Surprisingly, the contrary was found to occur.

On the other hand, we have found that urea alone is ineffective; the concentrated phytic acid solutions turn amber immediately upon addition of the urea and this color deepens with time. Accordingly, it is apparent that some catalytic action takes place between the amine and the nitric acid, both of which are necessary in concentrated solutions. We believe that the amine should be active in inhibiting the oxidizing action of the nitric acid.

Salts of nitric acid, such as sodium nitrate, potassium nitrate, and calcium nitrate, are equivalent to nitric acid in our invention. Enough nitric acid is released from the salt by the phytic acid to cooperate with the amine in producing the beneficial color-stabilizing action. A greater weight of salt than pure nitric acid is required because of the cation associated with the nitrate anion, and because of the partial dissociation of the salt by the phytic acid. We have observed that equivalent results are obtained by replacing the nitric acid with two to three parts by weight of the salt.

Preferably the nitric acid and amino compound are added to the phytic acid solution after its decolorization, e.g., with activated vegetable carbon. Less benefit is obtained by adding them prior to the decolorizing step because much of the amino compound will then be removed in this step.

We have discovered that heating the concentrated phytic acid prior to the addition of the amine and nitric acid permits a reduction in the necessary proportions of the additives to produce an equivalent improvement in the color stability of the phytic acid solutions. The heating of the phytic acid appears to accelerate the discoloration that normally occurs during storage, even when the phytic acid has been heated and decolorized earlier in the process of making it from phytin as disclosed in the Thomas patent, i.e., when still dilute.

We have found that beneficial action of heating in combination with later addition of nitric acid and an amino compound, is significant in phytic acid solutions of 40% or more concentration, and the benefit obtained increases with increasing phytic acid concentration, becoming especially pronounced at 70-75% concentrations and above. On the contrary, the heating step in accordance with our invention is of little or no benefit to phytic acid solutions below 40% concentration. Because of increasing viscosity and associated operating difficulties, the concentration of commercial phytic acid is currently limited to about 70%.

We have observed that 70% phytic acid solutions can be heated for eight hours at 80° C. without reducing their original phytin phosphorous content of about 26.5% to less than about 24%. Preferred heat treatment of the 70% solution is six hours at 70° C., which drops the phytin phosphorous content to about 25%. The same heat treatment applied to 40% phytic acid is somewhat less effective and is accompanied by more hydrolysis, i.e., more reduction in phytin phosphorous content. Pronounced beneficial effects are obtained by aging or heating the solutions under the following alternative conditions: 2 weeks at 40° C., 1 week at 50° C., 2 days at 60° C., 6 hours at 70° C., 2 hours at 80° C., 1 hour at 90° C., and 30 minutes at 100° C. Time, temperature and phytic acid concentration are obviously interrelated.

We have found that best results are obtained when the heat treatment in accordance with this invention is followed by the decolorization with charcoal or other absorptive agent. With somewhat less efficacious results, the decolorization and heat treatment may be combined.

We consider that the amino compounds that are useful in our invention include those water soluble compounds which suppress the formation of $NO_2$ from nitric acid. Examples of these are urea, diethylene glycol dicarbamate, alpha-amino acids such as those derived from proteins, primary aliphatic amines, and ammonia.

Only a small concentration of amino compound is necessary to obtain the desired effect. Without heat treatment, we have observed, a one-to-one weight ratio of urea to nitric acid is satisfactory and the nitric acid content does not have to exceed 2% based on moisture-free phytic acid. However, the amino compounds in combination with nitric acid are effective at 1% concentration and less.

In combination with the heat treatment, as little as one part by weight each of nitric acid and urea per 1000 parts by weight of phytic acid (water-free basis) will prevent discoloration of 70% phytic acid solution for at least one year when stored at 30° C. Half as much nitric acid and urea will stabilize 70% phytic acid for several months stored at 30° C. Higher proportions of nitric acid and urea are somewhat more effective, but the stabilizing action appears to level off rapidly above 0.6% based on the phytic acid.

Our invention is applicable in general to phytic acid solutions derived from naturally occurring phytic acid salts. The free acid has been liberated from its copper salt with hydrogen sulfide, from its calcium salt with sulfuric acid, from its sodium salt with concentrated hydrochloric acid followed by distillation to separate the two acids, and from its salts in general (including the slightly soluble calcium salt) with selected cation exchange resins in the hydrogen form. While the copper and sodium salts of phytic acid are not known to exist in nature, they are derivable by known methods from phytin. Phytin is a mixed calcium, magnesium, potassium salt of phytic acid of variable composition widely distributed in the vegetable kingdom. It is the chief source of the acid, whose synthesis is difficult.

Commercially, phytic acid is prepared according to United States Patent Number 2,691,035, using phytin obtained from corn steepwater as raw material. Although our invention has particular utility as applied to phytic acid solutions prepared in this way, it is not limited thereto. The amino compound-nitric acid combination according to our invention is a color stabilizer for phytic acid solutions derived from naturally occurring phytic acid salts by means other than ion exchange resins.

EXAMPLES 1 THROUGH 8

These examples illustrate the effectiveness of the nitric acid-amino compound combination in stabilizing the color of concentrated phytic acid. Crude phytic acid was prepared from corn steepwater phytin in accordance with the process disclosed in United States Patent Number 2,691,035. It was evaporated under vacuum to 40% concentration by weight. A 3 kilogram quantity of the crude acid was used as stock solution. The first two samples were prepared from the 40% stock solution by first mixing portions of it for 30 minutes at 70° C., with activated carbon in the ratio of 2.5 grams activated carbon to 125 grams of the stock solution. The carbon was separated by filtration. Then nitric acid and urea were added to portions of the decolorized solution. Two controls were prepared: control 1 with no additive, and control 2 with 1% nitric acid. The samples and controls were stored on an open laboratory shelf until the color changed, and the time was noted when the solutions first became dark.

The remainder of the crude 40% phytic acid was evaporated under reduced pressure to 70% concentration. This solution was then decolorized with activated carbon using a ratio of approximately 1 gram of carbon for 50 grams of the 70% acid. The remaining samples, Nos. 3 through 8, and controls 3 and 4 were prepared by mixing the desired additive and nitric acid in the desired concentrations with the 70% acid. The samples were then stored as before. The time when the solution changed color was noted, but in many there was no change in 30 months. The results are displayed in Table 1.

Table 1

| Example No. | Phytic Acid Conc., percent | Percent $HNO_3$ Added | Amino Compound Added | Percent Amino Compound Added | Time to Turn Dark |
|---|---|---|---|---|---|
| 1 | 40 | 1.0 | Urea | 0.6 | >30 months. |
| 2 | 40 | 0.6 | do | 1.0 | 14 months. |
| 3 | 70 | 0.3 | do | 0.3 | 6 months. |
| 4 | 70 | 0.6 | do | 0.6 | >30 months. |
| 5 | 70 | 0.6 | Glycine | 0.6 | Do. |
| 6 | 70 | 0.6 | Ethylene Diamine. | 0.6 | Do. |
| 7 | 70 | 0.6 | Ammonia | 0.6 | Do. |
| 8 | 70 | 0.6 | Diethylene Glycol Dicarbamate. | 0.6 | Do. |
| Control: | | | | | |
| 1 | 40 | none | none | none | 2 weeks. |
| 2 | 40 | 1.0 | do | none | 20 weeks. |
| 3 | 70 | none | do | none | 1 week. |
| 4 | 70 | 0.6 | do | none | 12 weeks. |

EXAMPLES 9 THROUGH 21

These examples illustrate the improvement obtained when the crude phytic acid is heated prior to decolorization with activated carbon and subsequently amino compound-nitric acid combination is added. Crude dilute phytic acid solution was prepared from corn steepwater phytin in accordance with the method of United States Patent Number 2,691,035. Portions of the dilute solution were evaporated under vacuum to 70, 60, and 40% concentrations and then cooled to 30° C. Samples of these concentrated solutions were heated for various times and temperatures, then stirred for 30 minutes at the same temperature with activated carbon. In Examples 9–11 and 18–21, the ratio of activated carbon to phytic acid was 15 grams to 400 grams; in Examples 12 to 17 the ratio was 4 grams per 125 grams of crude acid. The carbon was separated by filtration. Thereafter, varying amounts of nitric acid and an amino compound were added, and the solutions were stored on open shelves in glass-stoppered bottles. Control samples were prepared omitting the heat treatment but adding the amino compound-nitric acid combination. All of the solutions were observed for color change and the time of color change noted. The results are displayed in Table 2.

Table 2

| Example No. | Phytic Acid Conc., Percent | Heat Treatment | Nitric Acid Added | Amino Compound | Percent Amino Compd. Added | Time to Turn Black |
|---|---|---|---|---|---|---|
| 9 | 70 | 6 hrs. at 70° C | 0.1 | Urea | 0.1 | >30 months. |
| 10 | 70 | do | 0.3 | do | 0.3 | Do. |
| 11 | 70 | do | 0.6 | do | 0.6 | Do. |
| 12 | 60 | 12 hrs. at 60° C | 0.6 | do | 0.6 | Do. |
| 13 | 40 | 24 hrs. at 60° C | 0.6 | do | 0.6 | Do. |
| 14 | 70 | 1 hr. at 90° C | 0.1 | do | 0.1 | Do. |
| 15 | 70 | 2 hrs. at 80° C | 0.1 | do | 0.1 | Do. |
| 16 | 70 | 48 hrs. at 60° C | 0.1 | do | 0.1 | Do. |
| 17 | 70 | 7 days at 50° C | 0.1 | do | 0.1 | Do. |
| 18 | 70 | 6 hrs. at 70° C | 0.1 | Diethylene Glycol Dicarbamate. | 0.1 | Do. |
| 19 | 70 | do | 0.1 | Glycine | 0.1 | Do. |
| 20 | 70 | do | 0.1 | Ethylene Diamine | 0.1 | Do. |
| 21 | 70 | do | 0.1 | Ammonia | 0.1 | Do. |
| Controls: | | | | | | |
| 5 | 70 | none | 0.1 | Urea | 0.1 | 2 weeks. |
| 6 | 70 | do | 0.3 | do | 0.3 | 6 months. |
| 7 | 70 | do | 0.6 | do | 0.6 | >30 months. |
| 8 | 60 | do | 0.6 | do | 0.6 | 21 months. |
| 9 | 40 | do | 0.6 | do | 0.6 | 14 months. |

In comparing the results of Tables 1 and 2, it is evident that the preliminary heat treatment of the concentrated acid substantially reduces the content of the amino compound-nitric acid combination necessary to stabilize concentrated phytic acid.

As noted above, before our invention, it was observed that nitric acid-stabilized phytic acid in closed containers tended to release a gas and build up pressure in the containers, the gas having the characteristic reddish-brown color of $N_2O_4$. Usually, as is well known, when urea is added to nitric acid, there is a reaction that produces water (two molecules), nitrogen (two molecules), and carbon dioxide (one molecule). The reaction is described in Ephraim's Inorganic Chemistry (sixth edition). Accordingly, it might be expected that, in closed containers of phytic acid stabilized with urea and nitric acid, the release of nitrogen and carbon dioxide would also produce an increase in pressure in the container. Surprisingly, this was found not to be the case and we are unable to offer an explanation for it.

Since many embodiments may be made of this invention and since many changes may be made in the embodiments described, the foregoing is to be interpreted as illustrative only and the invention is to be defined by the claims appended hereafter.

What is claimed is:
1. In the process of preparing a concentrated aqueous solution of phytic acid derived from phytin, the improvement for stabilizing the color of the concentrated acid that comprises the step of adding to the concentrated acid a color-stabilizing amount of the combination of (1) a nitrate compound of the group consisting of nitric acid and water-soluble colorless nitrate salts and (2) a colorless, water-soluble, amino-group-containing compound selected from the group consisting of urea, diethylene glycol dicarbamate, alpha-amino acids, aliphatic primary amines and ammonia.
2. The method of claim 1 in which the amino-group-containing compound is urea.
3. The method of claim 1 in which the amino-group-containing compound is glycine.
4. The method of claim 1 in which the amino-group-containing compound is ethylene diamine.
5. The method of claim 1 in which the amino-group-containing compound is ammonia.
6. The method of claim 1 in which the amino-group-containing compound is diethylene glycol dicarbamate.
7. In the process of preparing a concentrated aqueous solution of phytic acid derived from phytin, the improvement for stabilizing the color of the concentrated acid that comprises adding to the concentrated acid a combination of (1) up to 2% nitric acid by weight of the phytic acid, and (2) a colorless, water-soluble, amino-group-containing compound that inhibits the oxidizing properties of nitric acid in an amount equivalent to up to 2% urea by weight of the phytic acid.
8. A color-stabilized, concentrated aqueous solution of phytic acid containing a color-stabilizing proportion of the combination of (1) a nitrate compound of the group consisting of nitric acid and water-soluble, colorless nitrate salts and (2) a colorless, water-soluble, amino-group-containing compound selected from the group consisting of urea, diethylene glycol dicarbamate, alpha-amino acids, aliphatic primary amines and ammonia.
9. A color-stabilized, concentrated aqueous solution of phytic acid containing a color-stabilizing proportion of the combination of nitric acid and a colorless, water-soluble, amino-group-containing compound selected from the group consisting of urea, diethylene glycol dicarbamate, alpha-amino acids, aliphatic primary amines and ammonia.
10. The composition of claim 9 in which the amino-group-containing compound is urea.
11. A color-stabilized, concentrated aqueous solution of phytic acid containing a color-stabilizing proportion of the combination of up to 2% by weight of nitric acid and a colorless, water-soluble, amino-group-containing compound selected from the group consisting of urea, diethylene glycol dicarbamate, alpha-amino acids, aliphatic primary amines and ammonia, the concentration of the amino compound being equivalent to up to 2% urea by weight of the phytic acid.
12. In the process of preparing a concentrated aqueous solution of phytic acid derived from phytin, the improvement for stabilizing the color of the concentrated acid that comprises heating the concentrated acid to form color bodies therein, treating the acid with a color adsorbent to decolorize it and thereafter adding to the decolorized acid a color-stabilizing proportion of the combination of (1) a nitrate compound selected from the group consisting of nitric acid and colorless, water-soluble salts thereof and (2) a colorless, water-soluble, amino-group-containing compound selected from the group consisting of urea, diethylene glycol dicarbamate, alpha-amino acids, aliphatic primary amines and ammonia.

13. The process of claim 12 in which the amino-group-containing compound is urea.

14. The process of claim 12 in which the amino-group-containing compound is glycine.

15. The process of claim 12 in which the amino-group-containing compound is ethylene diamine.

16. The process of claim 12 in which the amino-group-containing compound is ammonia.

17. The process of claim 12 in which the amino-group-containing compound is diethylene glycol dicarbamate.

References Cited in the file of this patent

UNITED STATES PATENTS

| 2,691,035 | McCalip | Oct. 5, 1954 |
| 2,718,523 | McCalip | Sept. 20, 1955 |
| 2,815,360 | Baldwin et al. | Dec. 3, 1957 |

OTHER REFERENCES

Price: J. Chem. Soc. 115, 1354–60 (1919).

Werner: The Chemistry of Urea, pp. 49–58 (1923), Longmans-Green & Co., London.

Titov: J. Gen. Chem., U.S.S.R. 17 382–92 (1947), cited in Chem. Abs. 42, 541 (1948).